(12) United States Patent
Casaliggi (10) Patent No.: US 10,808,536 B2
(45) Date of Patent: Oct. 20, 2020

(54) DEVICE FOR COOLING A TURBOMACHINE ROTOR

(71) Applicant: Safran Aircraft Engines, Paris (FR)

(72) Inventor: Pascal Gregory Casaliggi, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 56 days.

(21) Appl. No.: 15/941,802

(22) Filed: Mar. 30, 2018

(65) Prior Publication Data

US 2018/0283178 A1 Oct. 4, 2018

(30) Foreign Application Priority Data

Mar. 31, 2017 (FR) ...................... 17 52751

(51) Int. Cl.
*F01D 5/08* (2006.01)
*F01D 5/30* (2006.01)
(52) U.S. Cl.
CPC ............. *F01D 5/085* (2013.01); *F01D 5/081* (2013.01); *F01D 5/3007* (2013.01); *F01D 5/3015* (2013.01); *F05D 2220/32* (2013.01); *F05D 2260/221* (2013.01); *Y02T 50/673* (2013.01); *Y02T 50/676* (2013.01)
(58) Field of Classification Search
CPC .......... F01D 5/085; F01D 5/30; F01D 5/3007; F01D 5/3015; F01D 5/3023; F01D 5/3069; F01D 5/303; F01D 5/3038; F01D 5/081; F01D 5/082; F01D 25/08; F01D 25/12; F05D 2220/32; F05D 2260/221
See application file for complete search history.

(56) References Cited

U.S. PATENT DOCUMENTS

| 3,853,425 | A | 12/1974 | Scalzo et al. |
| 5,735,671 | A | 4/1998 | Brauer et al. |
| 7,690,896 | B2 * | 4/2010 | Stevens ................... F01D 5/081 |
| | | | 416/219 R |
| 2005/0084375 | A1 | 4/2005 | Rodrigues et al. |
| 2009/0110561 | A1 | 4/2009 | Ramerth et al. |
| 2016/0222787 | A1 | 8/2016 | Beattie et al. |
| 2017/0081963 | A1 * | 3/2017 | Batt ..................... F01D 25/285 |

FOREIGN PATENT DOCUMENTS

| EP | 1 524 406 A1 | 4/2005 |
| EP | 2 055 895 A2 | 5/2009 |
| WO | WO 2015/073112 A2 | 5/2015 |

OTHER PUBLICATIONS

French Preliminary Search Report dated Dec. 5, 2017 in Patent Application No. FR 1752751 (with English translation of categories of cited documents), 3 pages.

* cited by examiner

*Primary Examiner* — David E Sosnowski
*Assistant Examiner* — Danielle M. Christensen
(74) *Attorney, Agent, or Firm* — Oblon, McClelland, Maier & Neustadt, L.L.P.

(57) ABSTRACT

A device cools a disk of a turbine extending along an axis. The disk includes on its circumference at least one recess surrounded by disk teeth each having an upstream face. The recess includes a bottom in fluid communication with an upstream cavity by way of at least one lunula. The lunula includes lateral surfaces that are inclined with respect to the radial plane which constitutes the plane of symmetry of the recess into which the lunula opens.

19 Claims, 10 Drawing Sheets

DEVICE FOR COOLING A TURBOMACHINE ROTOR

GENERAL TECHNICAL FIELD AND PRIOR ART

The invention relates to turbomachines in general, and more specifically the ventilation of the stages of a turbine. Some fields of application of the invention are turbojets and turboprops of aircraft and industrial gas turbines.

A turbomachine traditionally includes a nacelle, the opening of which admits a predetermined stream of air toward the engine strictly speaking. Conventionally, the gases flow from upstream to downstream through the turbomachine.

Generally, the turbomachine comprises one or more sections for compression of the air admitted into the engine (generally a low-pressure section and a high-pressure section). The air thus compressed is admitted into the combustion chamber and mixed with fuel before being burned there.

The hot combustion gases resulting from this combustion are then decompressed in different turbine stages. A first decompression is done in a high-pressure stage immediately downstream of the combustion chamber and which receives the gases at the highest temperature. The gases are decompressed again, while being guided through the so-called low-pressure turbine stages.

Figure 1:
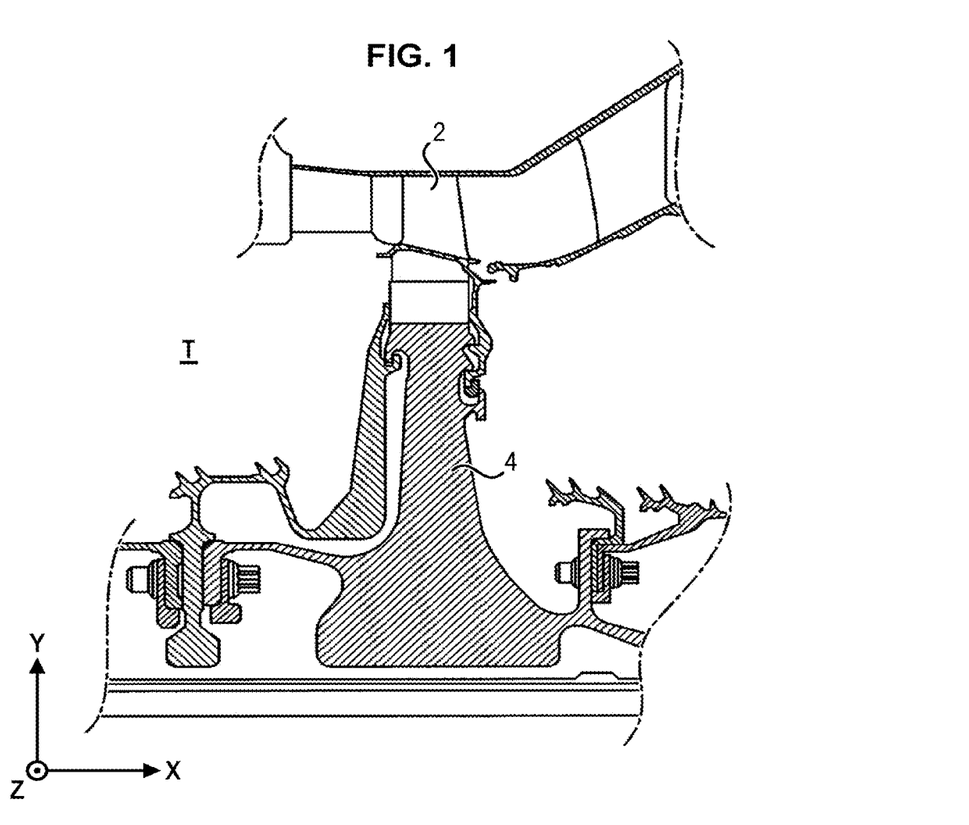
FIG. 1 is a schematic representation of a profile sectional view of a portion of a turbomachine turbine.

A low-pressure or high-pressure turbine T with axis X, an example of which is illustrated in FIG. 1, conventionally includes one or more stages, each being constituted of a row of stationary blades 1, also known as the distributor, followed by a row of movable blades 2, which form the rotor 3. The distributor 1 diverts the gas stream bled in the combustion chamber toward the movable turbine blades 2 at an appropriate angle and speed in order to rotationally drive these movable blades 2 and the rotor 3 of the turbine T.

The rotor generally comprises an assembly of several disks 4, an example of which is represented in FIG. 1.

Figure 2:
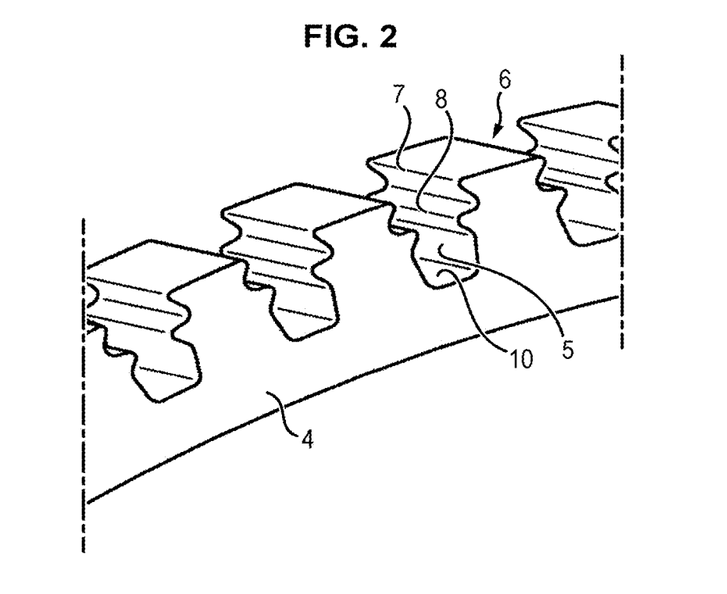
FIG. 2 is a 3D model centered on the circumferential profile of a rotor disk.

These disks 4 generally comprise, as in the embodiment represented in FIG. 2, peripheral grooves such as assembly indentations or recesses 5 in which the movable blades 2 are placed and held in position, particularly owing to the particular profile of the "teeth" 6 of the disk surrounding each indentation 5 (or recess) into which the blades 2 are inserted.

A disk tooth 6 has a profile including a first 7 and a second 8 span forming an assembly co-operating with complementary surfaces formed on the movable blade 2. These spans 7 and 8 provide a radial and tangential stop at the blade root with respect to the disk. Other geometries can also provide these functions, such as for example a blade root having a dovetail section.

Figure 3:
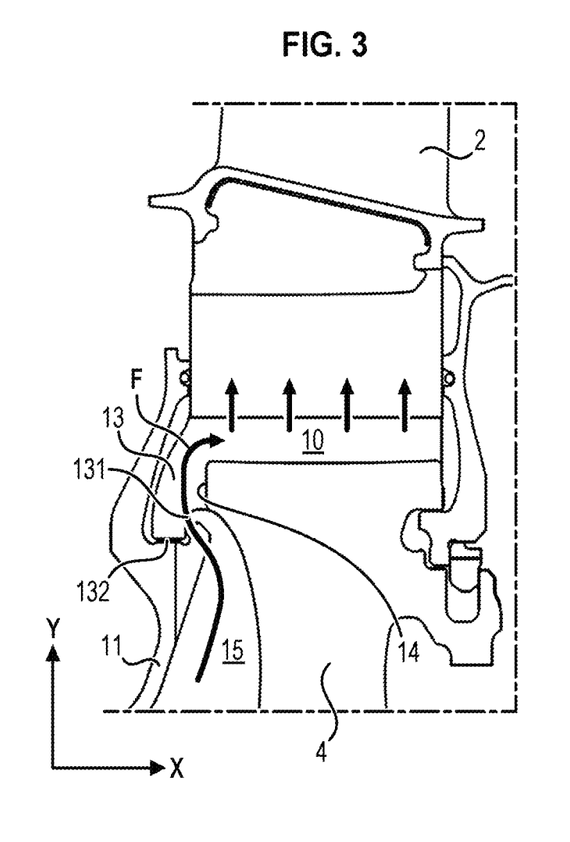
FIG. 3 is an axial sectional view centered on the assembly area between a rotor disk and a blade.

The axial stop of the movable blade 2 on the disk 4 can be provided by the rubbing between the blade 2 and the disk teeth 6, or by upstream 11 and downstream 12 flanges represented in FIG. 3.

A specific ventilation circuit for the disks 4 of the rotor has been designed to limit the effects due to the extreme thermal environment to which the rotor 3 is exposed.

The ventilation circuit directs a charged stream F of charged air bled upstream of the turbine T, typically in one of the compressors, to introduce it into the rotor 3 with the aim of cooling its disks 4, in particular its blades 2.

For this purpose, the blade includes a series of inner channels allowing the cooling stream F to circulate inside them and to cool the blade 2 more effectively.

The blade 2 does not completely fill the recess 5, forming a bottom 10 of the recess 5 extending substantially along the axis X, the bottom 10 of the recess 5 being located upstream (in the flow direction of the gases) of the inner channels allowing the circulation of the cooling stream F all the way to the latter.

This cooling stream F crosses several enclosures delimited by the rotor disks 4 and upstream 11 and downstream 12 flanges intended for this purpose, the different successive enclosures being put in fluid communication.

The axial and radial positioning necessary to the flanges 11 and 12 with respect to the rotor disks 4 to perform their role is conventionally produced by dog-clutches 13 located in the extension of the disk teeth 6. In the illustrated example, these dog-clutches 13 form an extra thickness at the upstream surface of the disk 4, this extra thickness forming an axial shoulder 131 allowing an axial positioning and a short centering 132 allowing a radial positioning of the sealing ring 11 on the rotor disk 4.

The dog-clutches 13 surround lunules 14, which are depressions extending substantially radially with respect to the axis X of the turbomachine and are usually machined directly on the upstream face of the rotor disk 4.

These lunules 14 ensure the continuity of the ventilation circuit by forming a fluid communication between a cavity 15 located upstream in the flow direction of the fluids and the recess bottoms 10 located in the recesses 5.

Figure 4A:
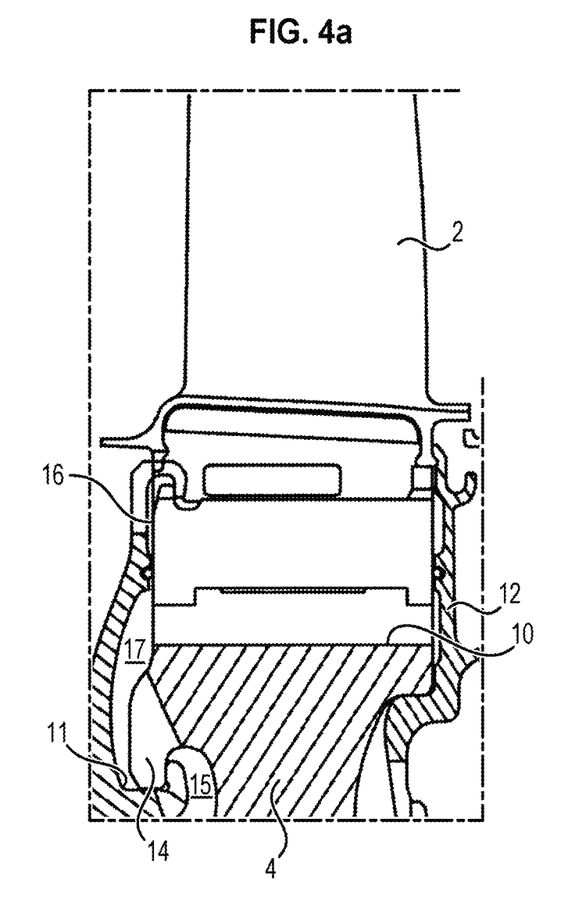
FIG. 4a is an axial sectional view of a first embodiment of a lunula of the prior art, symbolizing the trajectory of flow of the coolant.

In the prior art illustrated in FIG. 4a (see patent FR 2 981 979), the lunules 14 have an offset as well as an inclination with respect to the upstream surfaces 16 of the disk teeth 6. This embodiment has the disadvantage of forming an intermediate cavity 17 just upstream of the recesses 5. The cooling stream F circulates from an upstream cavity 15 toward the intermediate cavity 17 by the lunules 14.

Figure 4B:
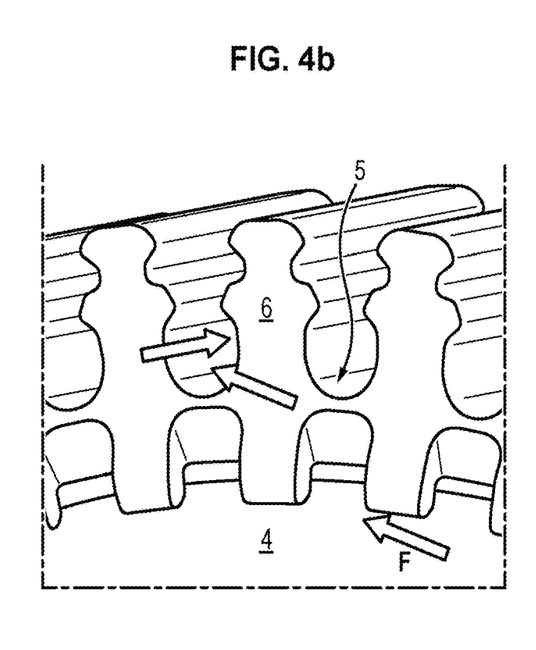
FIG. 4b is a 3D model of a first embodiment of a lunula of the prior art, symbolizing the trajectory of flow of the coolant.

In this intermediate cavity 17, the cooling stream F has a tangential speed lower than that of the recesses 5, this phenomenon being represented in FIG. 4b. This difference in tangential speed prevents the cooling stream F from circulating optimally toward the recesses 5 and reduces the performance of the cooling system.

Figure 5A:
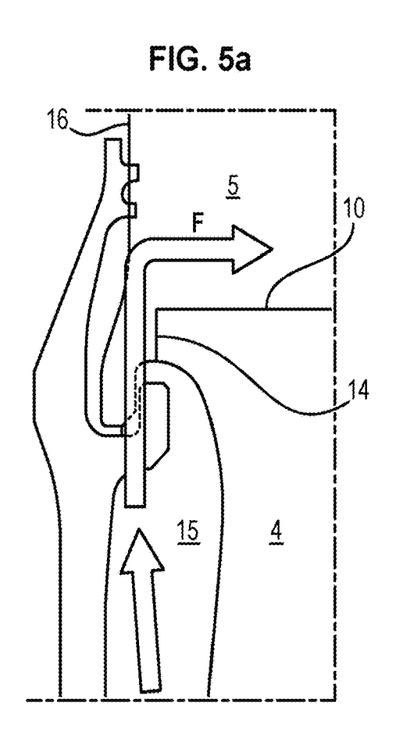
FIG. 5a is a profile sectional view of a second embodiment of the lunula of the prior art, symbolizing the trajectory of flow of the coolant.

With reference to FIG. 5a, a second embodiment has lunules 14 produced set back and not inclined with respect to the upstream surfaces 16 of the disk teeth 6.

Figure 5B:
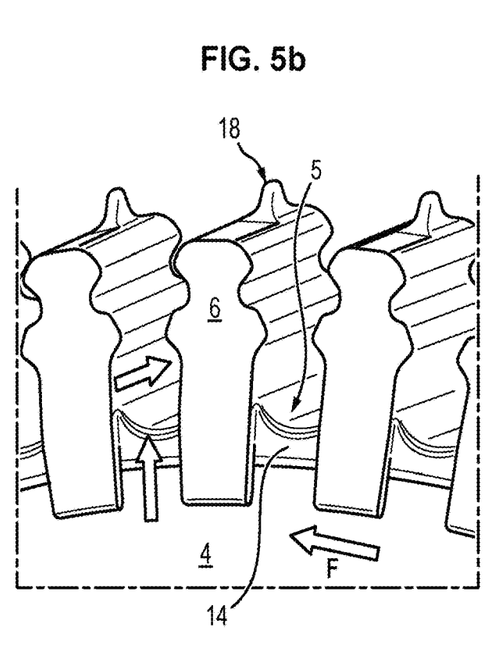
FIG. 5b is a 3D model of a second embodiment of a lunula of the prior art, symbolizing the trajectory of flow of the coolant.

In this way, the stream F passing through a lunula 14 is more able to circulate in the recesses 5, the effects of this embodiment being illustrated in FIG. 5b.

The disk teeth 6 can include keying pins 18 securing the assembly steps by avoiding the assembly of blades 2 axially back-to-front on the disks.

Figure 6A:
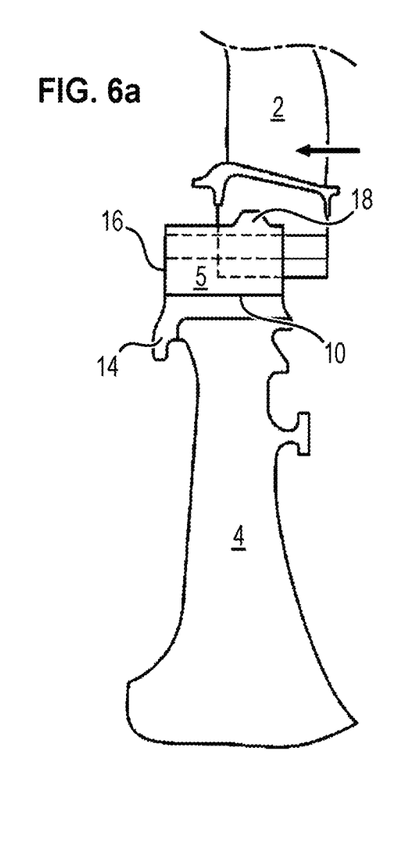
FIG. 6a is a schematic profile view of the assembly of a blade in a recess in a first direction.
Figure 6B:
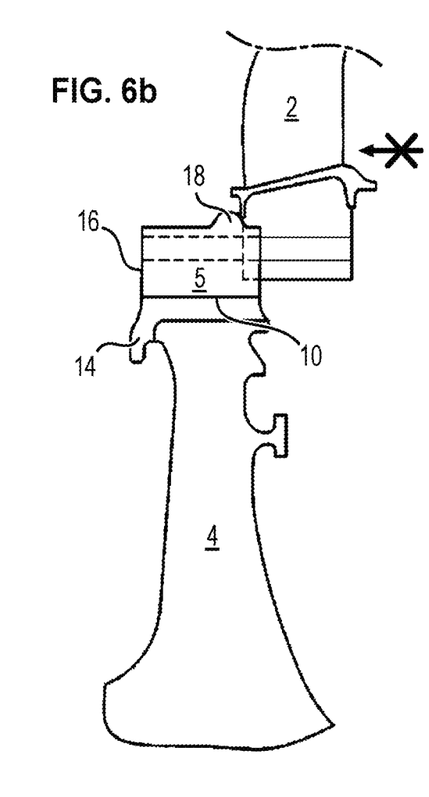
FIG. 6b is a schematic profile view of the assembly of a blade in a recess in a second direction.

With reference to FIG. 6, the blade 2 is inserted into the recess of the disk, and has a geometry co-operating with the keying pin 18 to prevent the blade from being inserted in the incorrect direction.

The keying pins 18 can also serve to balance the disk.

Figure 7A:
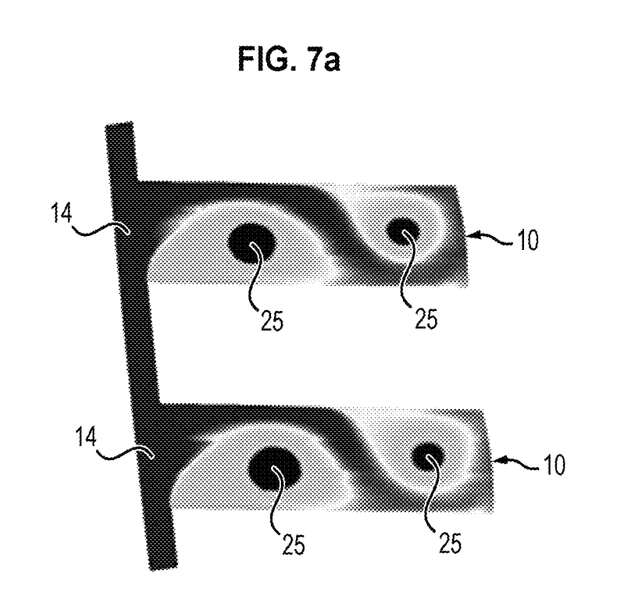
FIG. 7a is a representation of a simulation of the relative total pressure of the coolant in the recesses in the first embodiment of the prior art.
Figure 7B:
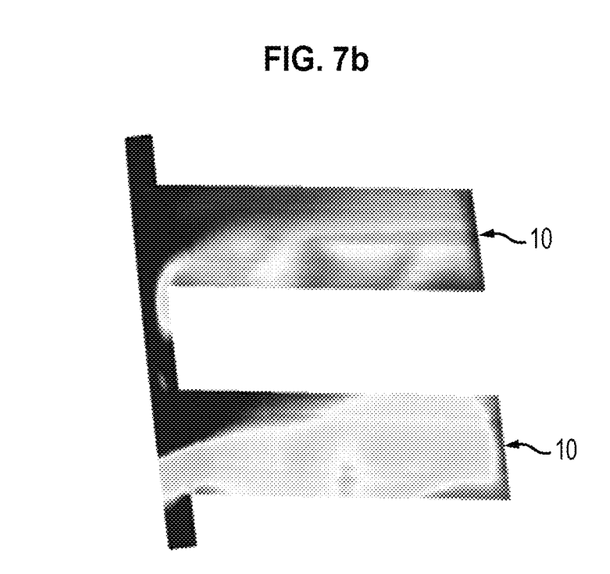
FIG. 7b is a representation of a simulation of the relative total pressure of the coolant in the recesses in the second embodiment of the prior art.

The relative total pressure of the gases in the recess bottom 10, represented in FIGS. 7a and 7b, emphasizes the effect of this modification on the distribution of the cooling stream F in the recesses 5.

FIG. 7a represents the distribution of the pressure of the gases in the recess bottom 10 in an embodiment where the lunules 14 have an angular offset and an offset of level in the upstream-ward direction with respect to the upstream surfaces 16 of the disk teeth 6, FIG. 7b representing the same parameter in the embodiment where the lunula 14 is set back in the downstream-ward direction with respect to the upstream surfaces 16 of the disk teeth 6.

The areas exhibiting lower relative total pressure levels 25 feed the cooling channels of the blading less effectively, which reduces the performance of the cooling system and therefore the lifetime of the blades 2.

It can easily be seen that the location of the lunules 14 set back from the upstream surfaces 16 of the disk teeth 6 makes it possible to limit the disparities in the distribution of the charge and to obtain a more homogenous flow, and therefore better cooling.

Figure 8:
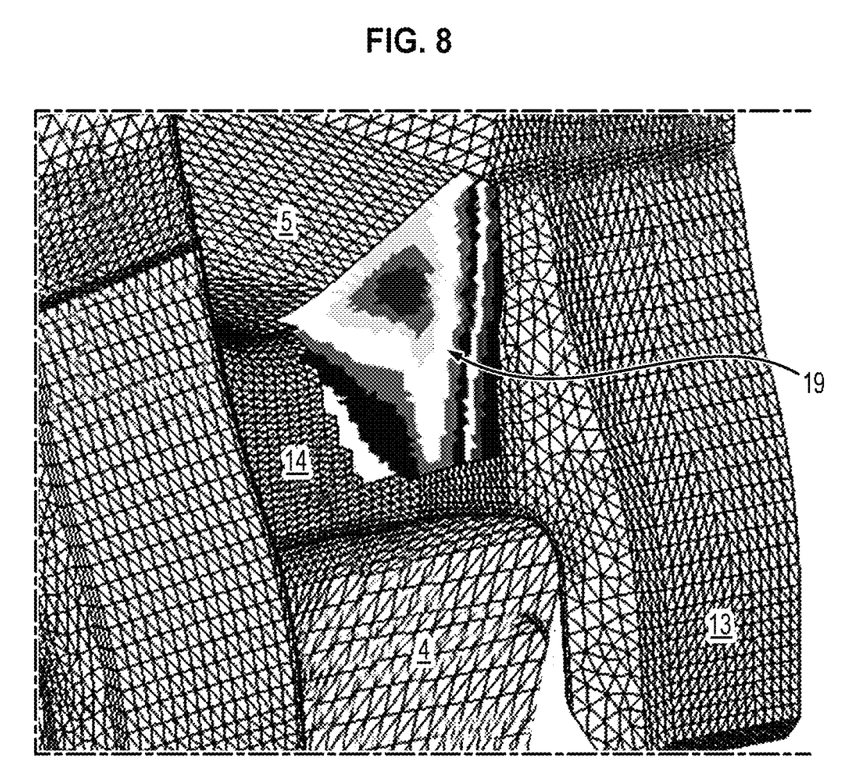
FIG. 8 is a finite element simulation of the distribution of the surface stresses at the lunula/recess interface area.

If this modification provides a gain in performance for the cooling system, it does however provide a drawback for the lifetime of the rotor disk 4. Specifically, the edge 19 between the lunula 14 and the recess 5 has areas of concentration of stresses, represented in FIG. 8.

These stress peaks greatly limit the lifetime of the disks 4. The flow of the cooling stream further including several bends, the overall loss of charge of the circuit also accounts for a factor substantially lessening the performance of the cooling system of the blades 2, and therefore limits the gain in lifetime of the blades 2.

OVERVIEW OF THE INVENTION

An aim of the invention is to increase the lifetime of the rotor disks.

Another aim is to increase the lifetime of the blades.

Another aim is to increase the performance of the cooling system.

Another aim is to reduce the charge losses in the cooling system.

Another aim is to decrease the concentrations of stresses in the vicinity of the lunules.

Another aim of the invention is to reduce the flow rate of the stream bled upstream of the turbines to feed the cooling system.

According to an aspect, the invention proposes a device for cooling a disk of a turbine extending along an axis, the disk including on its circumference at least one recess surrounded by disk teeth each having an upstream face, the recess including a bottom in fluid communication with an upstream cavity by way of at least one lunula, the lunula including lateral surface portions, characterized in that the lateral surface portions are inclined with respect to the radial plane forming the plane of symmetry of the recess into which the lunula opens, the recess extending along an axis inclined by a broaching angle with respect to the axis of the turbomachine, the broaching angle being between 0 and 20°.

Such a device is advantageously completed by the following various features taken alone or in combination:
- the lunula includes a bottom located set back in the downstream-ward direction with respect to the upstream faces of the disk teeth;
- the boundary between the lunula bottom and the recess bottom has a broken edge;
- the broken edge includes an edge fillet which has:
  - a first end, corresponding to an intersection between the fillet and a first tooth, and a second end, corresponding to an intersection between the fillet and a second tooth;
  - a plurality of radial planes, each radial plane comprising the axis of the turbine and cutting the fillet between the first and the second end, and
  - a plurality of radial sections, each radial section being defined by the intersection between an associated radial plane and the fillet, each radial section having a radius of curvature of the edge fillet, the radius of curvature of the edge fillet varying between the first and the second end, particularly according to the tangential position of the radius of curvature of the edge fillet;
- the ratio of the longest radius of curvature of the edge fillet to the shortest radius of curvature of said edge fillet can be between 2 and 20;
- the tangential position of the longest of the radii of curvature of the edge fillet is located at a stress peak of the edge fillet;
- the lunula includes a pressure side curved portion and a suction side curved portion joining the lateral surface portions and the bottom of said lunula, each curved portion containing a plurality of radii of curvature;
- the radii of curvature of the pressure side curved portion are different from the radii of curvature of the suction side curved portion;
- on the pressure side curved portion or the suction side curved portion, a ratio of a longer of the radii of curvature to a shorter of the radii of curvature is between 2 and 13;
- a ratio of each of the radii of curvature of the most charged of the pressure side and suction side curved portions to each of the radii of curvature of the least charged of the pressure side and suction side curved portions is between 1 and 20;
- an axis normal to the lunula bottom is defined as being perpendicular to a straight line passing through the ends of the bottom of the lunula, this normal axis being inclined by an angle of inclination with respect to the axis of the turbine in a first direction;
- the axis normal to the lunula bottom is inclined with respect to the axis of the turbine in a second direction;
- a ratio of the angle of inclination of the normal axis with respect to the axis of the turbine in the first direction, to the broaching angle, is between 0.2 and 1.4;
- the broaching angle $\phi$) is between 3° and 16°, preferably between 6° and 12°;
- the lateral surface portions of the lunula are curved, and wherein at least one of the lateral surface portions has a radius of curvature between 20 mm and 200 mm;
- the lateral surface portions have, at the recess bottom, an inclination of less than 20° with respect to a plane passing through a median point of the lunula at the recess bottom;
- the lateral surface portions have a radially inner end, and wherein the lateral surface portions have, at the radially inner end, an inclination between 15° and 60° with respect to a plane passing through a median point of the lunula at the radially inner end of the lateral surface portions;
- the radius of curvature of a lateral surface portion has a maximum value at the recess and a minimum value at the radially inner end of the lateral surface portions.

According to another aspect, the invention proposes a rotor including such a device for cooling a disk.

According to another aspect, the invention proposes a turbomachine including such a device for cooling a disk.

PRESENTATION OF THE FIGURES

Other features and advantages of the invention will become further apparent from the following description, which is purely illustrative and non-limiting, and must be read with reference to the appended figures wherein:

FIG. 12 represents an edge having an edge fillet, the radius of curvature of which varies in accordance with the invention; more precisely.

DESCRIPTION OF ONE OR MORE METHODS OF IMPLEMENTATION AND EMBODIMENTS

The embodiments described below concern the case of a turbine T comprising a series of distributors (or stators) alternated along the axis X of rotation of the turbomachine with a series of movable disks 4 (or rotor). This is however non-limiting, insofar as the turbine T could comprise a different number of stages, and can be single- or multi-stages.

The disks 4 have lunules 14, the geometry of which is optimized to facilitate the flow of the fluid in the cooling circuit and therefore the performance of the cooling system, while minimizing the concentrations of internal stresses in the part at the lunules 14.

Figure 9A:
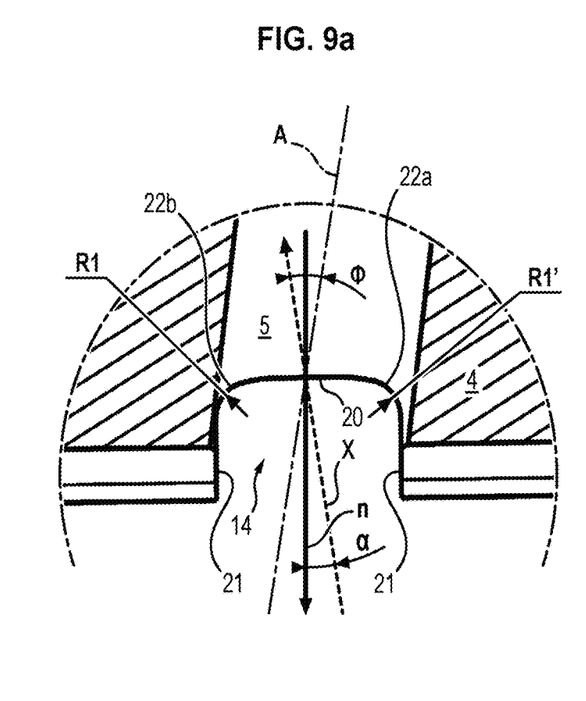
FIG. 9a is a top sectional partial view of the lunula.

With reference to FIG. 9a, the bottom 20 of a lunula 14 extends substantially radially with respect to the axis X of the turbomachine and can be defined by a normal axis n.

As the bottom 20 of the lunula 14 can have a variety of geometries, the normal axis n can be defined as perpendicular to a straight line passing through the ends of the bottom 20 of the lunula 14.

The normal axis n is inclined by an angle $\alpha$ with respect to the axis X of the turbomachine around a first radial axis Y of the rotor disk 4.

In certain embodiments, the recesses extend along a broaching axis A which can be inclined by a broaching angle $\phi$ with respect to the axis X of the turbomachine T.

This broaching angle $\phi$ can be between 0 and 20° with respect to the axial direction X, preferably between 3° and 16°, in particular between 6° and 12°. This inclination can be oriented in all directions, such that the potential orientation of the broaching axis is contained in a cone with an axis parallel to the axis X of the turbomachine and an aperture of 20°.

The inclination of the broaching axis A generates an asymmetry of the stresses at the lunula 14.

The wider the broaching angle $\phi$, the more asymmetrical the distribution of the stresses.

In order to minimize the stresses in the lunules 14, and particularly the stress maxima, the lunules 14 can have an asymmetrical geometry, making it possible to preserve the aerodynamic performance and the technical feasibility of the least charged part while promoting the mechanical performance in the most charged part.

The angle $\alpha$ of inclination of the normal n to the lunula 14 with respect to the axis X of the turbomachine thus makes it possible to reduce the effect of asymmetry of the stress distribution, particularly by reducing the stress peak in the most charged area.

The term "stress peak" is understood to mean a local maximum of stress.

The ratio of the angle $\alpha$ of inclination to the broaching angle $\phi$ can be between 0.2 and 1.4.

The closer the angle $\alpha$ of inclination to the broaching angle $\phi$, the more the dissymmetry of the stresses is attenuated.

The normal n to the lunula 14 can be contained in a plane orthogonal to a radius issuing from the axis X of the turbomachine, the angle $\alpha$ of inclination being expressed in this plane.

The lunula 14 is also delimited by lateral surface portions 21 extending substantially radially, and two so-called pressure side 22a and so-called suction side 22b curved surface portions joining the bottom 20 of the lunula 14 and the lateral surfaces 21 of the lunula 14. The curved surface portions respectively pressure side 22a and suction side 22b correspond here to a surface portion arranged respectively on the pressure side and suction side of the vane of the blade 2 assembled in the corresponding recess 5.

The pressure side 22a and suction side 22b curved surface portions of the lunules 14 have radii of curvature R1, R1' maximized to minimize the stress concentration coefficients.

Each curved portion 22a and 22b can contain several different radii of curvature R1, R1' according to the location of the point in question.

Due to the asymmetrical concentration of the stresses at the lunules 14, a symmetrical geometry of the lunula 14 could fail to have any significant effect on the reduction of the maximum stress peak simulated in the disk 4 at the lunula 14.

For this reason, each of the curved surface portions 22a and 22b has a radius of curvature R1, R1' that can be fixed or variable, the radius of curvature R1' of the pressure side curved portion 22a being able to be identical to or different from the radius of curvature R1 of the suction side curved portion 22b.

As a function of the broaching angle ϕ, one among the pressure side curved portion 22a and the suction side curved portion 22b can be more charged by stress than the other.

In the example illustrated in FIG. 9a, the inclination of the broaching axis A with respect to the axis X of the turbomachine generates a stress distribution in the lunula 14 in which the suction side curved portion 22b is the most charged.

Obviously, for an opposite value of broaching angle ϕ, the stress distribution obtained would have higher stresses in the pressure side curved portion 22a than in the suction side curved portion 22b.

The greater the broaching angle ϕ, the greater the tangential distance of the stress peak from a median point of the lunula 14 and the more asymmetrical the stress distribution.

The term "median point of the lunula" 14 is understood to mean a point of the lunula 14 located equidistantly from the suction side curved portion 22b and the pressure side curved portion 22a.

The term "tangentially" is understood to mean a tangential direction issuing from a radius, and which is orthogonal to said radius and to the axis X of the turbomachine.

For a zero broaching angle ϕ, the stress distribution would be symmetrical.

As a function of the configuration of the broaching angle D, and thus of the position of the stress peak, the most charged curved portion 22a, 22b has greater radii of curvature than the least charged curved portion.

The ratio of a radius of curvature R1, R1' of one of the most charged curved portions 22a, 22b to a radius of curvature of a lightly-charged curved portion can be between 1 and 20.

More particularly, the wider the broaching angle ϕ, the greater the ratio of the greatest radius of curvature R1, R1' of the most charged curved portion 22a, 22b to the smallest radius of curvature of the least charged curved portion.

In the illustrated example, the ratio of the greatest radius of curvature of the suction side curved portion 22b to the smallest radius of curvature of the pressure side curved portion 22a is between 4 and 6, for example 5.

Such a configuration makes it possible to minimize the stress concentration coefficients and to decrease the intensity of the stress peak and the stresses in the lunula 14.

A same curved portion 22a, 22b can have different radii of curvature, distributed as a function of the position of the stress peak. The closest radius of curvature to the stress peak is the greatest, in such a way as to minimize the stress concentration coefficient at the most critical point.

The radius of curvature R1, R1' over one and the same curved portion 22a, 22b can vary from 1.5 mm in a lightly-charged area to 20 mm in a heavily-charged area.

Over one and the same curved portion 22a, 22b, the ratio of the shortest radius of curvature to the longest radius of curvature can thus be between 2 and 13.

This notably makes it possible to optimize the mechanical characteristics in the critical areas, and the manufacturing and the aerodynamic performance in the less charged areas of one and the same curved portion 22a, 22b.

In the illustrated example, the radius of curvature R1 of the suction side curved portion 22b can vary between 1.65 mm and 10 mm, for a disk 4 having an outer diameter of 370 mm. The ratio of the longest radius of curvature R1 to the shortest radius of curvature can be between 5 and 7.

The outer diameter of a disk 4 is expressed at the outer boundary of the teeth 6. The different dimensions of the lunules 14 vary as a function of the diameter of the disk 4.

Figure 9B:
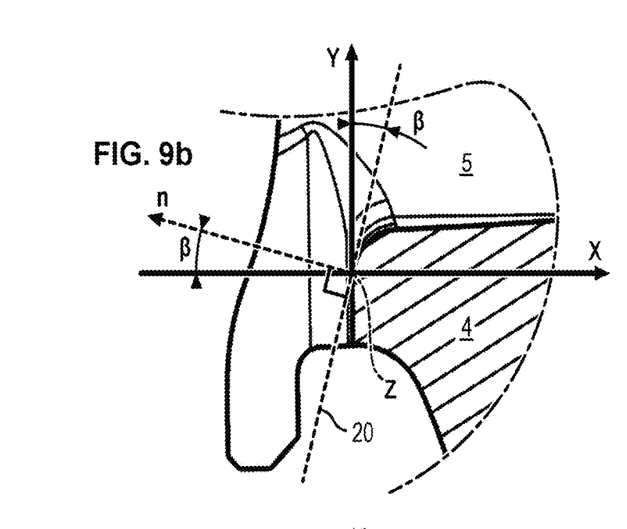
FIG. 9b is a profile sectional partial view centered on the lunula.

With reference to FIG. 9b, the normal axis n is inclined by an angle β with respect to the axis X of the turbomachine around the second radial axis Z of the rotor disk 4.

In an embodiment, the second radial axis Z is a tangential axis perpendicular to the first radial axis Y.

Figure 9C:
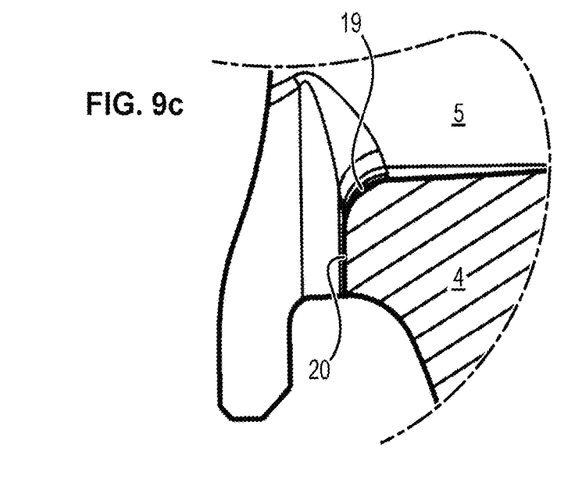
FIG. 9c is a profile sectional partial view centered on the lunula.

With reference to FIG. 9c, a critical factor for the concentration of stresses at the lunula 14 is the presence of a sharp edge 19 between the lunula 14 and the recess 5.

This edge 19 can have a geometry designed to reduce the stress concentration factor in this area.

This geometry can comprise a chamfer, a fillet, a rounding, a boss, an extra thickness or any mechanical or thermal processing used to reduce the maximum stress peak measured in the area of the lunula or to locally improve the mechanical characteristics of the part.

In the case of an edge fillet, the fillet can have a radius of curvature r that varies with the point of the fillet. This embodiment makes it possible to significantly reduce the phenomenon of stress concentration in the area of the lunula 14.

The fillet has:
  a first end, corresponding to an intersection between the fillet and a first tooth, and a second end, corresponding to an intersection between the fillet and a second tooth.
  a plurality of radial planes, each radial plane comprising the axis X and cutting the fillet between the first and the second end, and
  a plurality of radial sections, each radial section being defined by the intersection between an associated radial plane and the fillet.

Figure 12A:
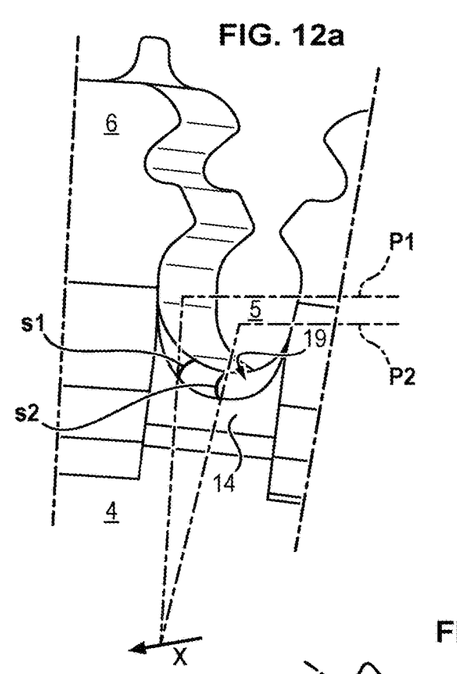
FIG. 12a represents an edge at the boundary between a lunula and a recess, the edge having a fillet and being cut by two radial planes, FIG. 12b representing a detail view of the edge.
Figure 12B:
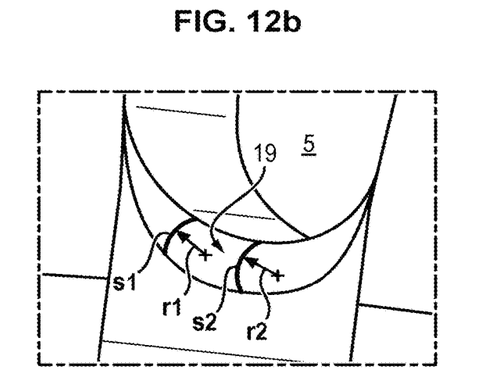

Each radial section has a curvature. The curvature of said sections varies between the first and the second end. Notably, the radius of curvature r of the radial sections of the edge fillet varies according to the tangential position of the radius of curvature r of the edge fillet. For example, FIG. 12a illustrates two radial sections S1 and S2 defined by the intersection between two associated radial planes P1 and P2 and the fillet. As can be seen in FIG. 12b, the radii of curvature r1, r2 of these radial sections S1, S2 are different.

The area of the fillet the closest to the stress peak has the radius of curvature r of the longest edge fillet. More precisely, as a function of the broaching angle ϕ, the position of the stress peak can be closer to the first end of the edge fillet (or the second end, respectively). In this case, the radius of curvature of the edge fillet in the area adjacent to this first end must therefore be longer (or shorter, respectively) than that of the edge fillet in the area adjacent to the second end.

Consequently, the tangential position of the radius of curvature r of the longest edge fillet is a function of the broaching angle ϕ.

The more a point of the fillet is charged, the greater the radius of curvature r of the edge fillet at this point. The distribution of the radii of curvature r of the edge fillet depends on the distribution of the stresses on the edge 19.

The ratio of the longest radius of curvature r of the edge fillet to the shortest radius of curvature of said edge fillet can be between 2 and 20, for example 5.

The shortest of the radii of curvature r of the edge fillet can be between 0.5 mm and 2.5 mm, for example between 0.8 and 1.5 mm for a disk 4 with an outer diameter of 370 mm having a recess bottom with a radius of curvature of 4 mm.

The longest of the radii of curvature r of the edge fillet can be between 2 mm and 10 mm, for example between 3.5 mm and 7 mm for a disk with an outer diameter of 370 mm having a recess bottom 10 with a radius of curvature of 4 mm.

The geometry of the edge 19, and therefore of the fillet, varies as a function of the diameter of the disk 4 and the radius of curvature of the recess bottom 10.

Such a configuration makes it possible to reduce the stress concentration coefficient in the most charged areas and therefore to decrease the stress levels, and the stress peak.

In addition to the stress concentration in the lunula 14, this modification makes it possible to reduce the criticality of the part in a standard established by a consortium of engine manufacturers (Rotor Integrity Sub-Committee (RISC)).

This rating (RoMan) associates a degree of criticality to a part as a function of the geometrical elements it has, and is used to determine the manufacturing method that will be applied to produce this part.

The lower the criticality, the less stringent, and thus less expensive, the manufacturing methods.

The removal of a sharp edge 19 in favor of an edge 19 with a fillet makes it possible to reduce the criticality of the disk 4. Reduction of the criticality of the disk 4 makes it possible to produce it by methods which are simpler to implement, and to reduce its manufacturing cost.

Figure 9D:
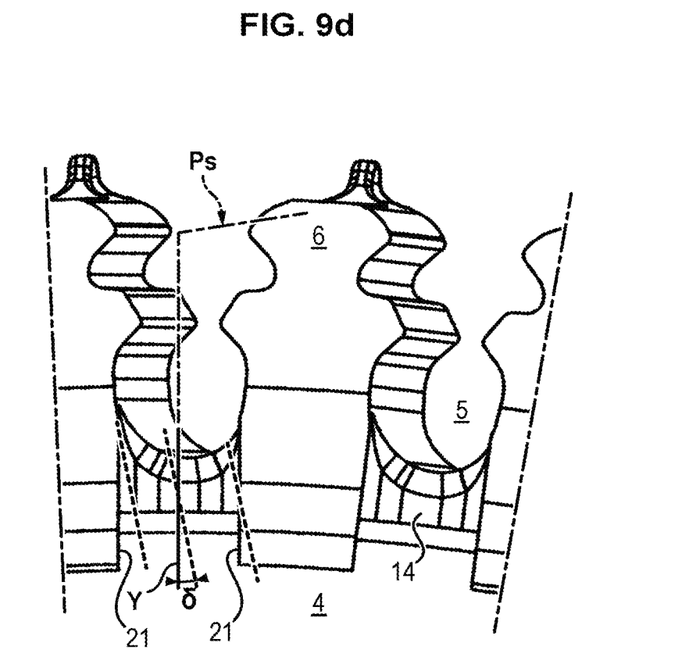
FIG. 9d is a 3D representation of a portion of a disk centered on the recesses and the lunulas.

In an embodiment illustrated in FIG. 9d, the lateral surface portions 21 of the lunula 14 are inclined (angle δ) with respect to the radial plane which constitutes the plane of symmetry of the recess 5 into which the lunula 14 opens.

Specifically, despite the position of the lunules 14 set back from the upstream surfaces 16 of the disk teeth 6, a difference in tangential speed remains between the cooling stream F and the recesses 5. The cooling stream F first circulates axially to reach the upstream cavity 15, then radially to reach the lunules 14 and finally axially to enter the recesses 5 despite the tangential speed of the latter due to the rotation of the disks 4.

Figure 10A:
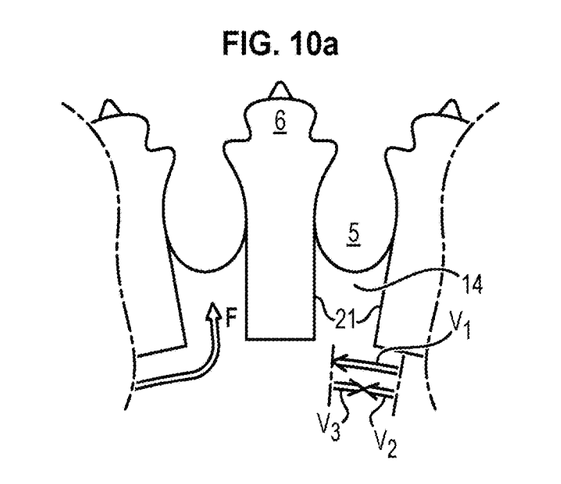
FIG. 10a is a schematic representation of a front view of a disk portion highlighting a straight lunula embodiment.

With reference to FIG. 10a, at the opening upstream of a lunula 14, the coolant circulates at a tangential speed V1 whereas the point of the disk 4 at this radius has a tangential speed V2 greater than that of the fluid.

The fluid therefore has a relative speed V3 with respect to the disk 4, oriented inversely with respect to the speed V1 of the disk 4 at this point.

The fluid therefore circulates with respect to the disk 4 in the reverse direction to the rotation of the disk 4.

Figure 10B:
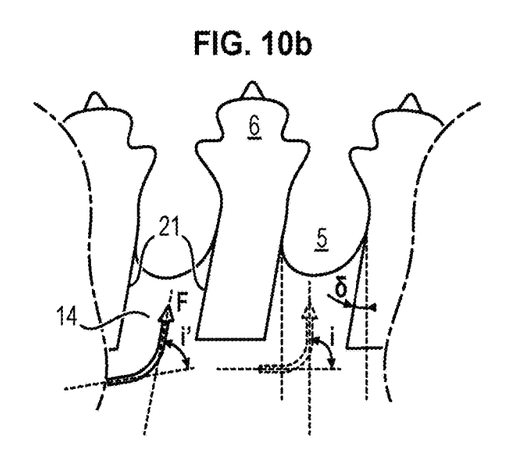
FIG. 10b is a schematic representation of a front view of a disk portion highlighting an inclined lunula embodiment as well as the effect on the flow of the stream of such an inclination.

Consequently, to reduce the effect i of the bend in the stream of coolant, the lateral walls of the lunules 14 are inclined (angle δ) with respect to a radial plane Ps corresponding to a plane of symmetry of the recess 5.

The inclination of the lateral surface portions 21 of the lunules 14 (angle δ) lessens the bend in the direction of the cooling stream F at the lunula 14. It promotes its admission into the recess 5 by decreasing the singular charge loss in this area, thereby increasing the effectiveness of the cooling system.

The direction of inclination is chosen as a function of the desired direction of rotation for the disk 4 in operation in order to decrease the bend that the cooling stream F must cross.

Figure 11:
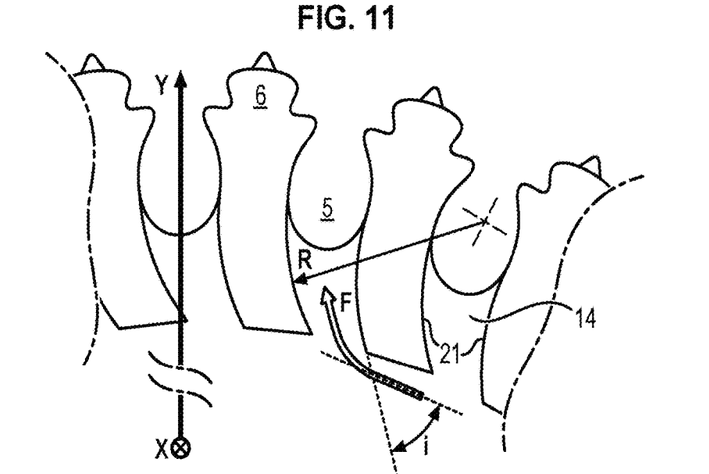
FIG. 11 is a schematic representation of a front view of a disk portion highlighting a curved lunula embodiment.

With reference to FIG. 11, in order to limit the effect of the bends in the flow, the lateral surface portions 21 of the lunules 14 can have a curvature, thereby allowing the decrease of the singular charge losses in the ventilation circuit and thus increasing its performance.

This curvature can be a simple curvature or a more complex curvature (with a twist for example).

The curvature of the lateral surface portions 21 can be constant or have a variable radius of curvature configured to minimize the charge losses along the lunula 14.

The curvature of the lateral surface portions 21 makes it possible to further reduce the effect i in the bend of the coolant stream.

Specifically, the inclination of the lateral surface portions 21 of the lunules 14 cannot exceed a certain limit due to the geometrical features of the disk 4, its manufacturing process and the mechanical characteristics to be complied with.

A curvature makes it possible to reduce the effect of the bend in the coolant stream while also reducing the inclination of the lateral surface portions 21 for an equal effect.

Figure 13:
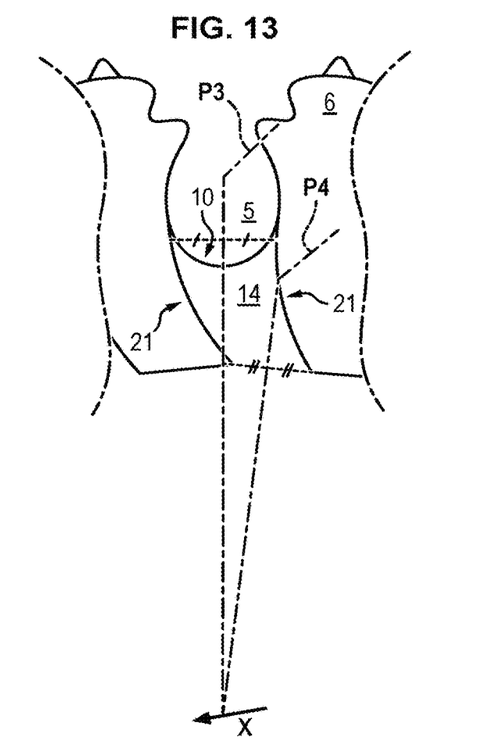
FIG. 13 represents a lunula in accordance with the invention, the lateral surface portions of which are curved.

The lateral surface portions 21 can have, at the bottom 10 of the recess, an inclination of less than 20° with respect to a radial plane P3, passing through a median point of the lunula 14, preferably an inclination of less than 10°.

The term "radial plane" P3 is understood to mean the plane passing through the median plane of the lunula 14 at the bottom 10 of the recess and containing the axis X of the turbomachine. The median point of the lunula 14 corresponds here to the point located at the bottom 10 of the recess and equidistant from the lateral surface portions 21. Such a median point has been illustrated by way of example in FIG. 12.

The inclination of the lateral surface portions 21 at the recess bottom 10 promotes the entrance of the cooling stream into the recess 5.

The lateral surface portions 21 have one end which is radially inner with respect to the axis of the turbomachine.

The lateral surface portions 21 can have, at their inner end, an inclination between 15° and 60° with respect to a radial plane P4, where the plane P4 passes through a median point of the lunula 14 at the radially inner end of the lateral surface portions 21 and comprising the axis X, in such a way as to promote the entrance of the cooling stream into the lunula 14.

The term "median point" is understood to mean the median point of the lunula 14 at the radially inner end of the lateral surface portions 21, the point located at the inner end of the lateral surface portions 21 and equidistant from the lateral surface portions 21.

In a plane normal to the axis X of the turbomachine and passing through a lateral surface portion 21, the radius of curvature R of the lateral surface portion 21 can be between 20 mm and 200 mm. The radius of curvature R of the lateral surface portion 21 can be constant, and have for example a value of 50 mm.

In a variant, the radius of curvature R of the lateral surface portion 21 can vary and have a maximum value in the most stressed area, at the recess 5, in such a way as to minimize the concentrations of stresses and a minimum value at the radially inner end of the lateral surface portions 21, in such a way as to minimize the effect i of the bend of the cooling stream entering into the lunula 14.

The decrease in charge losses in the cooling system makes it possible to improve its performance, thus increasing the lifetime of the disks 4 and the blades 2.

This decrease in charge losses also makes it possible to reduce the flow rate of the stream bled upstream of the turbine to feed the cooling system, thus minimizing the effect of the cooling system on the performance of the turbomachine.

The invention claimed is:
1. A disk of a turbine extending along an axis of the turbine, the disk comprising:

at least one recess on a circumference of the disk, the recess being surrounded by disk teeth each having an upstream face, the recess including a bottom in fluid communication with an upstream cavity by way of at least one lunula, the lunula including lateral surface portions, and the recess having a radial plane corresponding to a plane of symmetry of the recess into which the lunula opens, wherein the lateral surface portions are inclined with respect to the radial plane, and the recess extends along an axis inclined by a nonzero broaching angle with respect to the axis of the turbine, the broaching angle being greater than 0° and less than or equal to 20°, wherein the lunula includes a pressure side curved portion and a suction side curved portion joining the lateral surface portions and a bottom of said lunula, each curved portion containing a plurality of radii of curvature, and wherein the radii of curvature of the pressure side curved portion are different from the radii of curvature of the suction side curved portion.

2. The disk according to claim 1, wherein the bottom of the lunula is located set back in the downstream-ward direction with respect to the upstream faces of the disk teeth.

3. The disk according to claim 2, wherein the boundary between the bottom of the lunula and the bottom of the recess has a broken edge comprising a chamfer, a edge fillet, a rounding, a boss, or an extra thickness.

4. The disk according to claim 3, wherein the broken edge includes the edge fillet which has a varying radius of curvature.

5. The disk according to claim 4, wherein the edge fillet has:
 a first end, corresponding to an intersection between the edge fillet and a first tooth, and a second end, corresponding to an intersection between the edge fillet and a second tooth,
 a plurality of radial planes, each radial plane comprising the axis of the turbine and cutting the edge fillet between the first and the second end, and
 a plurality of radial sections, each radial section being defined by the intersection between an associated radial plane and the edge fillet, each radial section having a radius of curvature of the edge fillet, the radius of curvature of the edge fillet varying between the first and the second end, and wherein the ratio of the longest radius of curvature of the edge fillet to the shortest radius of curvature of said edge fillet is between 2 and 20.

6. The disk according to claim 5, wherein the tangential position of the longest of the radii of curvature of the edge fillet is located at a stress peak of the edge fillet.

7. The disk according to claim 5, wherein the radius of curvature of the edge fillet varies between the first and the second end according to the tangential position of the radius of curvature of the edge fillet.

8. The disk according to claim 2, wherein an axis normal to the bottom of the lunula is defined as being perpendicular to a straight line passing through the ends of the bottom of the lunula, this normal axis being inclined by an angle of inclination with respect to the axis of the turbine in a first direction.

9. The disk according to claim 8, wherein the axis normal to the bottom of the lunula is inclined with respect to the axis of the turbine in a second direction.

10. The disk according to claim 8, wherein a ratio of the angle of inclination of the normal axis with respect to the axis of the turbine in the first direction, to the broaching angle, is between 0.2 and 1.4.

11. The disk according to claim 1, wherein on the pressure side curved portion or the suction side curved portion, a ratio of a longer of the radii of curvature to a shorter of the radii of curvature is between 2 and 13.

12. The disk according to claim 1, wherein a ratio of each of the radii of curvature of the most stressed of the pressure side and suction side curved portions to each of the radii of curvature of the least stressed of the pressure side and suction side curved portions is between 1 and 20.

13. The disk according to claim 1, wherein the broaching angle is between 3° and 16°.

14. The disk according to claim 13, wherein the broaching angle is between 6' and 12°.

15. The disk according to claim 1, wherein the lateral surface portions of the lunula are curved, and wherein at least one of the lateral surface portions has a radius of curvature between 20 mm and 200 mm.

16. The disk according to claim 15, wherein the lateral surface portions have, at the bottom of the recess, an inclination of less than 20° with respect to a plane passing through a median point of the lunula at the bottom of the recess.

17. The disk according to claim 15, wherein the lateral surface portions have a radially inner end, and wherein the lateral surface portions have, at the radially inner end, an inclination between 15° and 60° with respect to a plane passing through a median point of the lunula at the radially inner end of the lateral surface portions.

18. The disk according to claim 17, wherein the radius of curvature of a lateral surface portion has a maximum value at the recess and a minimum value at the radially inner end of the lateral surface portions.

19. A turbomachine comprising:
 the disk according to claim 1.

* * * * *

UNITED STATES PATENT AND TRADEMARK OFFICE
CERTIFICATE OF CORRECTION

PATENT NO. : 10,808,536 B2  
APPLICATION NO. : 15/941802  
DATED : October 20, 2020  
INVENTOR(S) : Pascal Gregory Casaliggi Page 1 of 1

It is certified that error appears in the above-identified patent and that said Letters Patent is hereby corrected as shown below:

In the Specification

In Column 4, Line 33, delete "Φ)" and insert -- (Φ) --.

In Column 7, Line 29, delete "D," and insert -- Φ, --.

In Column 8, Line 27, delete "tooth." and insert -- tooth, --.

In the Claims

In Column 11, Line 11, Claim 1, delete "nonzero" and insert -- non-zero --.

In Column 12, Line 30, Claim 14, delete "6'" and insert -- 6° --.

Signed and Sealed this  
Thirteenth Day of July, 2021

Drew Hirshfeld  
*Performing the Functions and Duties of the  
Under Secretary of Commerce for Intellectual Property and  
Director of the United States Patent and Trademark Office*